Patented May 12, 1936

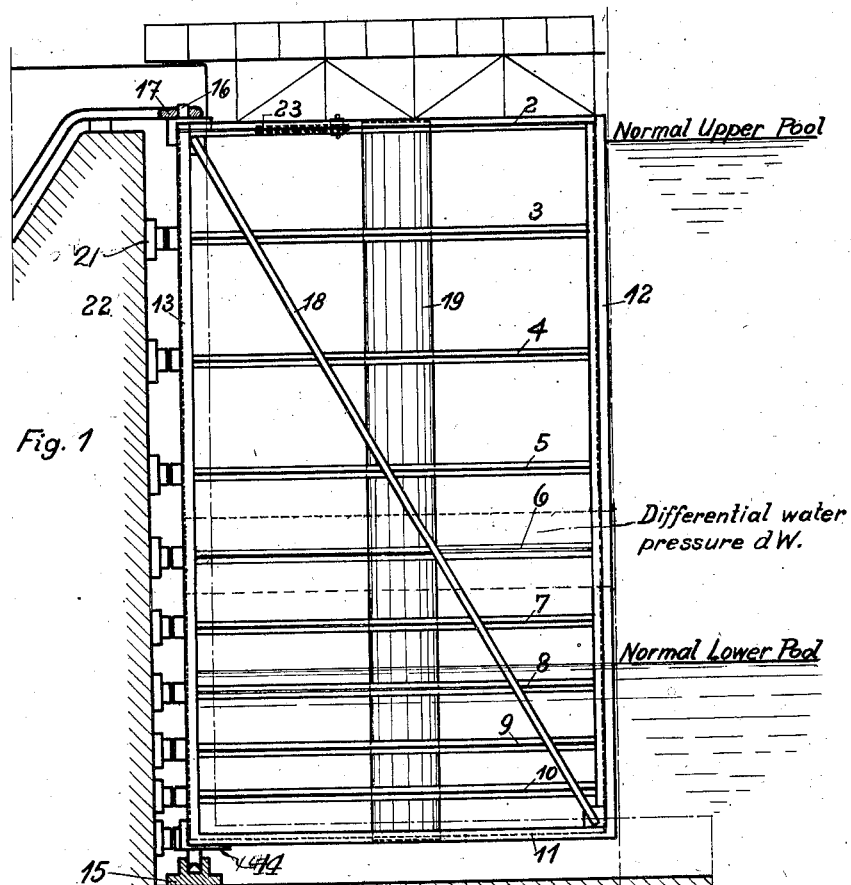
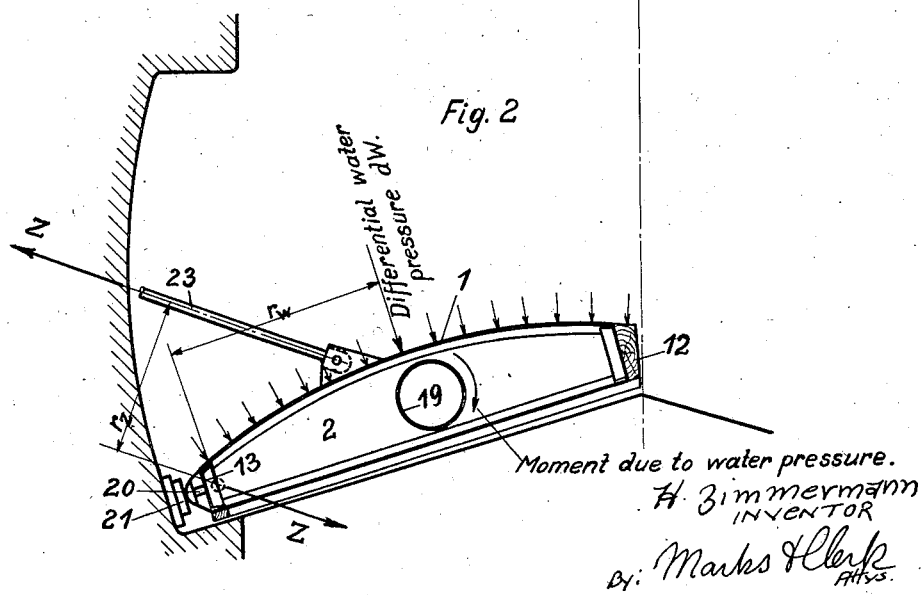

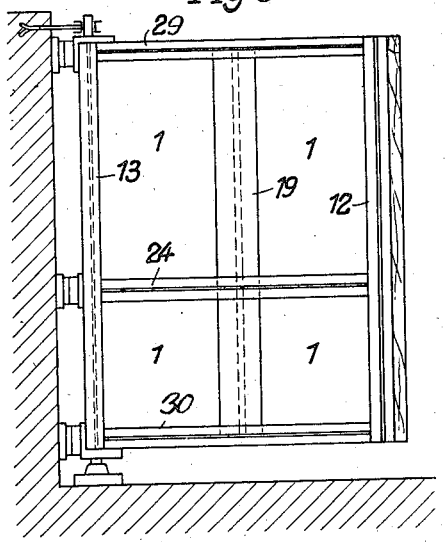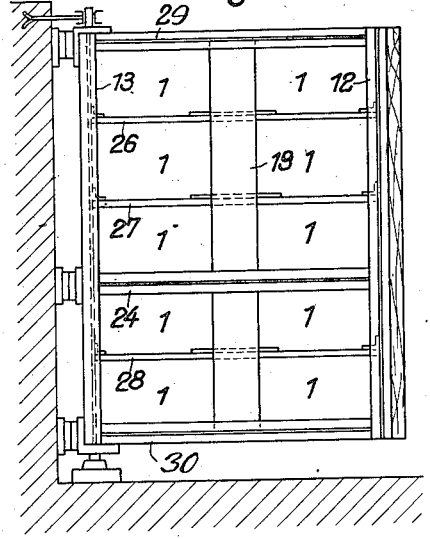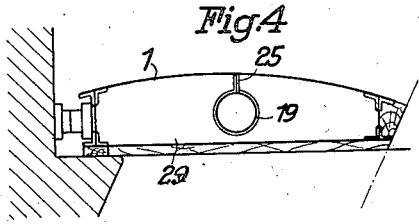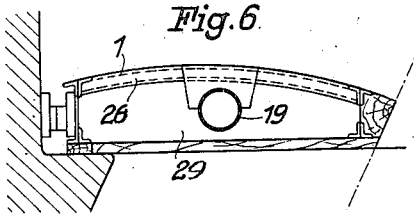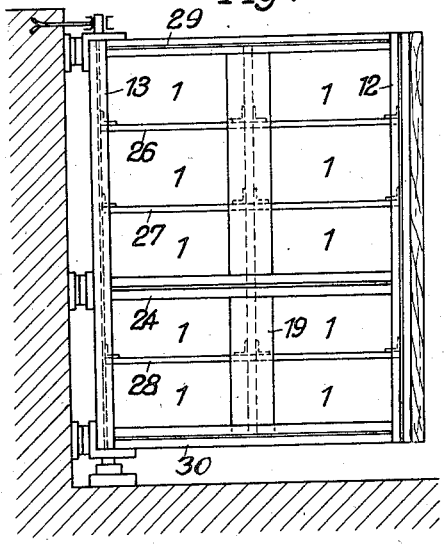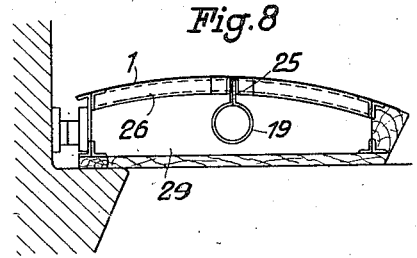

2,040,721

UNITED STATES PATENT OFFICE 2,040,721

LOCK GATE

Hans Zimmermann, Dortmund, Germany, assignor to the firm Vereinigte Stahlwerke Aktiengesellschaft, Dusseldorf, Germany Application July 26, 1932, Serial No. 624,679½
In Germany August 14, 1931

7 Claims. (Cl. 61—24)

This invention relates to lock gates for sluices, docks or the like and to a construction which has a greater torsional resistance than the hitherto known forms of construction without the necessity of resorting to box-like gates closed on all sides or giving the gate body a greater height than is necessitated by the statically requisite height of the cross-bars. In consequence thereof the gate can be moved even against a considerable one-sided water pressure by a driving rod attacking the gate above the water level on the uppermost cross-bar or on one of the upper cross bars, the lowest point of the closing jamb undergoing only a very slight horizontal bending in comparison with other known structural forms of lock gates.

For this purpose a body which is torsion-resistant in itself is built into the gate so as to pass vertically therethrough and is rigidly connected with each cross-bar of the gate. Therefore, upon moving the gate against the water pressure the lower gate corner is allowed to deflect only by reason of its torsion which can be kept small in spite of a low weight.

The said torsion-resisting body which is built into the gate according to the invention partially takes up the water pressure acting upon the gate in the closed position. The body is preferably formed as a tube which is subjected to torsional stresses only during the movement of the gate but not in the shut position. In order to transmit the water pressure in the desired manner the plane, undulated or curved metal sheet of the gate wall may be supported upon the tube either directly, or by means of intermediate cross-bars, or by using a combination of these means. The increase of the resistance of the gate is due to the fact that the exceedingly great resistance to bending of the tube is used between each two cross-bars to support the gate wall. As this tube is used for the absorption of both the torsional and the bending stresses which do not act at the same time and as furthermore the bending length of the wall or of the cross-bars is decreased (preferably halved by arranging the tube in the centre of the gate), there is a considerable saving in weight. Further it becomes possible to dispense with intermediate jambs, so that the number of the rib connections and structural parts is decreased and the structure is simplified.

In the accompanying drawings the invention is illustrated by way of example in several forms of construction. In the drawings:

Figure 1 is an elevation of one sample of a lock gate section with built-in stiffening member.

Figure 2 is a plan of the gate of Figure 1.

Figure 3 is an elevation of another form of construction of a stiffened gate section wherein the gate wall is directly supported on the stiffening body.

Figure 4 is a horizontal section through the gate section of Figure 3.

Figure 5 is an elevation of a further form of construction of a gate section with stiffening tube wherein the wall is supported on the tube by means of intermediate cross-bars.

Figure 6 is a horizontal section through a gate section according to Figure 5.

Figure 7 is an elevation of a further form of construction of a lock gate section with stiffening tube and direct as well as indirect supports of the stow wall against the tube by using intermediate cross-bars.

Figure 8 is a horizontal section through a gate section according to Figure 7.

In the illustrations, 1 is the sheet metal wall, 2 is the top cross bar, 3 to 10 the intermediate cross-bars and 11 is the lowest cross-bar of the gate section, 12 is the closing jamb and 13 the pivoting post. The sheet metal wall 1 is rigidly connected with the cross-bars 2–11, with the closing jamb 12 and with the pivoting post 13. 14, 15 are the lower and 16, 17 the upper pivot bearings of the gate section. 18 indicates a diagonal member extending from the upper pivot bearing to the lower end of the closing jamb 12, on those parts of the cross-bars 2–11 which are directed to the low water level side. 19 is a torsion resisting body—in the present example a tube—which is rigidly connected to all the cross-bars 2–11 so as to resist twisting. The said rigid connection of the tube 19 with the cross-bars may be produced by welding or riveting. The cross-bars extend over the entire width of the gate or they are at least wider than the diameter of the tube 19 so that sufficient material for connecting the cross-bars with the tube is disposable. The cross-bars are preferably constructed as sheet metal supports through the web plate of which the said tube passes. 20 are the pressure studs on the gate and 21 the pressure plates on the lock wall 22. 23 is the rod for moving the gate section, which is attached at the level of the uppermost cross-bar and is driven by a device arranged on the lock wall 22.

If, when the gate is moved in the opening direction, there is a pressure of the upper pool against the lower pool, either due to a not totally equalized water level before and behind the gate at the beginning of the said movement or due to the formation of a swell during the said movement, then a differential water pressure $dW$ will act upon the section of the gate wall belonging to each cross-bar. For example the pressure acting upon the gate wall belonging to the cross-bar 6 is shown by hatching in Figure 1. The sum of these single differential water pressures $dW$ is counteracted by the bending resistant pivoting post which is arranged between the two pivot bearings of the corresponding gate section with a counter-force of the same extent but of an opposite direction so that a torsional moment remains which is equal to the product from the force $dW$ and the distance between this force and the counter-force absorbed by the bending resistance of the pivoting post. By means of the rigid connection of the cross-bars with the torsion resisting tube, the said torsional moment is transmitted to the latter. By a connection which is also torsion resistant the total sum of these torsional moments transmitted to the single cross-bars and which is indicated by the arrow in Figure 2 designated by "moment due to water pressure", is transmitted to that cross-bar in the plane of which the draw rod engages, for instance to the cross-bar 2 in Fig. 2. In order to establish the equilibrium at the said cross-bar (for instance cross-bar 2) a torsional moment must act upon it in the opposite direction. This is produced by a couple formed by the force Z of the draw rod and a counter-force which is equal and opposite thereto and which acts in the upper pivot bearing of the gate. Consequently, all forces of this system are balanced.

Since each cross-bar can be bent only by reason of its torsion relative to the cross-bar with which the draw rod engages, the bending of the various cross-bars depends only on the torsional resistance of their connection and it can easily be proved by calculation that even in the case of very small dimensions of the torsion resisting body the deflection can be kept within limits which are of no practical importance.

The above mentioned saving in weight is obtained over hitherto known structural forms of lock gates as well as in comparison with other systems of gates, for example, sliding gates or the like which have been employed often on account of the tendency of lock gates to be distorted by unilateral pressure during movement.

In place of the hitherto used double diagonal braces which resist bending and which protect the closing jamb against twisting, it is sufficient for the absorption of the perpendicular loads, according to the present invention, to have only one diagonal 18 on the low water side of the gate section, united to the gate wall which is on the high water level side.

This also simplifies the construction and reduces the cost of the new gates, since the diagonals of the already known gates had to be broken at each cross-bar and then rigidly connected.

The torsion resisting body 19 can be passed through the cross-bars at any desired place, subject only to being secured against torsion. It is advantageous to construct the torsion resisting body as a buoyant body, so that it will lessen the load on the bearings during the pivoting movement in the water.

In the gate shown in Figures 1 and 2 there is a comparatively large number of cross-bars 2 to 11. It is, however, often advantageous to decrease the number of cross-bars on account of the many rivets and the large number of cast steel supports (pressure plates 21) required.

In the forms of construction according to Figures 3-8 it is possible to considerably reduce the number of cross-bars, without having to increase the dimensions of the gate wall and therefore the total weight. On the contrary, there will be a saving in weight, since the concentration of the stresses on a lesser number of principal members is known to result in a lesser weight, as many cross members which otherwise are indispensable though not fully utilized can be dispensed with.

In Figures 3-8, the numbers 29, 30 and 24 refer to the only cross-bars with which the torsion resistant stiffening tube 19 is rigidly connected, while 25 is the direct support of the gate wall 3 against the tube 19, as shown in Figures 4 and 8. This support, according to Figures 3 and 4, is effected by a perpendicular rib 25, according to Figures 5 and 6 by horizontal ribs (26, 27, 28) arranged between the cross-bars, and according to Figures 7 and 8 by a perpendicular rib 25 and horizontal ribs 26, 27 and 28.

Figures 3-8 show that in the closed position of the gate the water pressure is transferred to a great extent to the tube, so that its high resistance to bending is utilized for the purpose of decreasing the dimensions of the gate section itself and/or its supporting ribs.

The above description shows that the present invention, which is not limited to the forms of application shown in the illustrations, provides an efficient and practical means of increasing the resistance of lock gates, without it being necessary to place the driving device for the draw rod under the water level, and that at the same time an efficient reduction of the water pressure on the wall in the closed position, and with a saving in structural material, and a reduction of the load on the hinges, are obtained.

What I claim and desire to secure by Letters Patent is:

1. A lock gate for sluices or the like, comprising a pivoting post, a closing jamb, horizontal cross bars secured to the post and the jamb, a wall connected with the cross bars at the high water side thereof, and a torsion resistant body extending vertically through said cross bars and rigidly connected therewith, whereby torsional stresses arising during movement of the gate against the water pressure will be resisted by said torsion resistant body.

2. A lock gate for sluices or the like, comprising a pivoting post, a closing jamb, horizontal cross bars secured to the post and the jamb, a wall connected with the cross bars at the high water side thereof, and a torsion resistant body of substantially circular cross section extending vertically through said cross bars and rigidly connected therewith, whereby torsional stresses arising during movement of the gate against the water pressure will be resisted by said torsion resistant body.

3. A lock gate for sluices or the like, comprising a pivoting post, a closing jamb, horizontal cross bars secured to the post and the jamb, a wall connected with the cross bars at the high water side thereof, a torsion resistant body extending vertically through said cross bars and rigidly connected therewith, and means connecting said torsion resistant body to the inner surface of the wall between said cross bars, whereby torsional stresses arising during movement of the gate against the water pressure will be resisted by said torsion resistant body.

4. A lock gate for sluices or the like, comprising a pivoting post, a closing jamb, horizontal cross bars secured to the post and said jamb, a wall connected with said cross bars at the high water side thereof, a torsion resistant body extending vertically through said cross bars and rigidly secured thereto, a diagonal member arranged on the lower water level side of the gate and having one of its ends connected to the upper end of the pivoting post and its other end secured to the lower end of the closing jamb, whereby torsional and twisting stresses arising during movement of the gate against the water pressure will be resisted respectively by said torsion resistant body and said diagonal member.

5. A lock gate for sluices or the like, comprising a pivoting post, a closing jamb, horizontal cross bars secured to the post and the jamb, a wall connected with the cross bars at the high water side thereof, and a buoyant torsion resistant body of hollow construction extending vertically through said cross bars and rigidly connected therewith, whereby torsional stresses arising during movement of the gate against the water pressure will be resisted by said torsion resistant body.

6. A lock gate for sluices or the like, comprising a pivoting post, a closing jamb, horizontal cross bars secured to the post and said jamb, a wall connected with said cross bars at the high water side thereof, a tube extending through said cross bars and adapted to resist torsional stresses imparted to said gate during movement of the latter against the water pressure, means rigidly connecting said tube to said cross bars, and horizontal ribs connecting the tube with the inner surface of the wall between the cross bars.

7. A lock gate for sluices or the like, comprising a pivoting post, a closing jamb, horizontal cross bars secured to the post and said jamb, a wall connected with said cross bars at the high water side thereof, a tube extending through said cross bars and adapted to resist torsional stresses imparted to said gate during movement of the latter against the water pressure, means rigidly connecting said tube to said cross bars, and a vertical rib and horizontal ribs connecting the tube with the inner surface of the wall between the cross bars.

HANS ZIMMERMANN.